(No Model.)
C. A. OLCOTT.
LAWN MOWER.
No. 408,426. Patented Aug. 6, 1889.
Fig. 1.
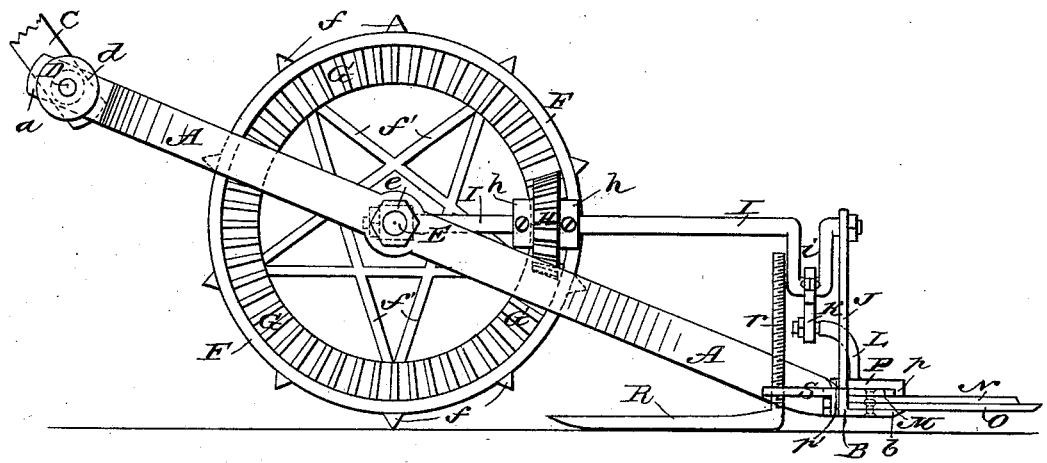
Fig. 4.
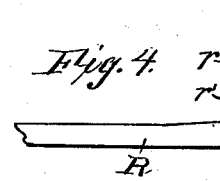
Fig. 2.
Fig. 5.
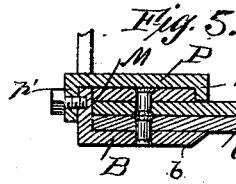
Fig. 3.
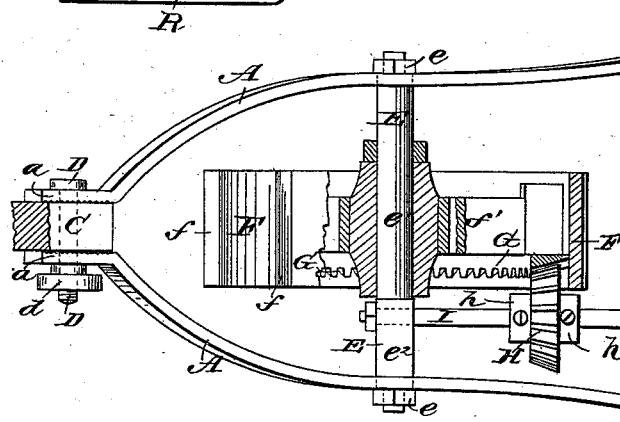
WITNESSES:
INVENTOR:
C. A. Olcott
BY Munn & Co.
ATTORNEYS.

UNITED STATES PATENT OFFICE.

CHARLES A. OLCOTT, OF NORTH VERNON, INDIANA.

LAWN-MOWER.

SPECIFICATION forming part of Letters Patent No. 408,426, dated August 6, 1889.

Application filed September 20, 1886. Serial No. 214,033. (No model.)

*To all whom it may concern:*

Be it known that I, CHARLES A. OLCOTT, of North Vernon, in the county of Jennings and State of Indiana, have invented a new and Improved Lawn-Mower, of which the following is a full, clear, and exact description.

My invention relates to lawn-mowers, and has for its object to provide an efficient machine having few and simple parts and adapted to be operated easily, and one which will cut the grass at any desired height, and will work under fences or over walks, and will leave a smooth clean lawn.

The invention consists in certain novel features of construction and combinations of parts of the lawn-mower, all as hereinafter fully described and claimed.

Reference is to be had to the accompanying drawings, forming a part of this specification, in which similar letters of reference indicate corresponding parts in all the figures.

Figure 1 is a side elevation of my improved lawn-mower with its handle broken away. Fig. 2 is a plan view thereof with parts broken away and in section; and Fig. 3 is an enlarged face view of the clutch-driving pinion and its pin with the cranked shaft, through which the pin passes, shown in transverse section. Fig. 4 is a view of the shoe and bracket-plate detached, and Fig. 5 is a detail transverse sectional view through the L-shaped bar, the cutter-bar and its cutters, the fixed cutters, and one of the guides for said cutter-bar.

The letters A A indicate the two opposite side bars of the machine-frame, which bars are fixed at their forward ends to the L-shaped or angular metal bar B, to which the lower cutters are secured, as presently described.

The bars A A approach each other at their rear ends $a$ $a$, the inner faces of which are serrated or roughened, so as to allow the forward end of the handle C of the lawn-mower to be clamped between them by means of a headed screw-bolt D and a hand nut or wheel $d$, fitted on the bolt, and so that by loosening the hand-nut $d$ the handle C may be set and clamped at any desired elevation to suit the height of the person operating the mower. The hand-nut $d$ may also be left loose to allow the mower to work over terraces and on uneven ground.

In the side bars A A are fitted the reduced ends of the axle E, which ends receive nuts $e$ outside the bars to bind the axle immovably thereto. On the round portion $e'$ of the axle is fitted loosely the main drive-wheel F, which has formed on or fixed to it the bevel-gear G, into which meshes the driving-pinion H, which is placed loosely on a shaft I, which is journaled at one end in the squared portion $e^2$ of the axle E, and at its forward end is journaled in an upright J, fixed to the L-shaped bar B.

The shaft I has a crank $i$, with a throw of about three inches, and is connected by a rod or pitman K with a bracket-arm L, which is fixed to the upper movable cutter-bar M of the mower to reciprocate said cutter-bar when the mower is pushed forward, the cutter-bar remaining at rest when the machine is drawn backward. To allow this mode of operation of the cutter-bar, the driving-pinion H is held in place by collars $h$ $h$, fastened to the shaft I by set-screws or otherwise, one at each face of the pinion, and so as always to mesh with the driving-gear G on the wheel F. At one face, preferably its forward face, the pinion H is provided with a series of recesses $h'$, each of which is shaped with a square shoulder $h^2$ at one end and at its other end dies away or terminates in a point $h^3$ at the journal-bearing of the pinion on the driving-shaft, the outer edge of the recess being curved between the shoulder $h^2$ and point $h^3$ to form a cam-face $h^4$. In a transverse slot of the shaft I there is placed loosely a clutch-pin H', which is preferably rounded over from opposite sides at the opposite ends. Thus arranged, it is obvious that as the pinion H is rotated in direction of the arrow 1 in Fig. 3 the end of the clutch-pin H', projecting beyond one side of the shaft, will engage the shoulder $h^2$ of one of the recesses $h'$ of the pinion H to turn the shaft by the drive-wheel through the pinion, and thus operate the cutter-bar as the machine is pushed forward, and as the machine is drawn backward and the pinion H is rotated in direction of the arrow 2 the cam-faces $h^4$ of the pinion-recesses will simply move the clutch-pin H' in the shaft-slot without driving effect on the shaft. Consequently the shaft and cutter-bar remain at rest until the machine is again pushed forward and the pin H' engages one of the recess-shoulders $h^2$ to again reciprocate the cutter-bar.

I make the drive-wheel F with ribs or teeth $f$ across its periphery to prevent slip on the ground, and I connect the hub of the wheel to its rim by spokes $f'$, disposed in star form, which gives a neat appearance and great strength, with lightness, to the wheel.

N represents the upper series of cutters, which are fixed at their rear ends to the under side of the cutter-bar M, and at their forward ends are tapered both ways to a point and are sharpened from the upper side or face, as shown clearly in Fig. 2.

The cutters N work on the upper faces of the fixed cutters O, which have the same general form as the cutters N, but are sharpened from their under sides or faces and are about one-half inch longer than the movable cutters, said cutters O being fixed to the upper face of the horizontal flange or plate $b$ of the bar B. (See Fig. 1.)

The letters P P indicate guides, which are bolted through their rear pendent lug $p'$ to the bar B and overlap the top of the cutter-bar M, and have front lugs or lips $p$, which stand at the front edge of the bar M, and thus hold the bar and its cutters N in proper position relatively to the fixed cutters as the movable cutters are reciprocated.

R R are two shoes, which have vertical stems $r$, which are screw-threaded to engage screw-threaded holes or apertures in the bracket-plates S S, secured to the opposite ends of the vertical flange of the L-shaped bar B. The threads of these stems $r$ loosely engage the threads of the holes or apertures in the plates S S, so that the stems are free to turn, and yet may be adjusted when turned fully around in either direction. As the stems $r$ project upward from the forward ends, or in front of the centers of the shoes, the shoes will turn properly in line with the direction of movement of the machine, and no lifting will be required to raise the shoes in turning curves, as would be the case if only vertical adjustment and no free horizontal movement of the shoes was afforded. In practice the shoes will be formed from a piece of round iron or other suitable metal bent at right angles and having its vertical member threaded and its horizontal member flattened, as shown in Fig. 4.

It is evident that the shoes R will not enter small holes or depressions in the lawn, as rollers would; hence the lawn will be cut much more smoothly than when the cutter-bar and cutters are supported by rollers at or near each end of the bar.

The lower fixed cutters O, by being made longer than the movable cutters N, constitute efficient guards to the moving cutters or knives, and the ordinary guard-fingers are not necessary.

The effective cutting length of the cutters N is about three inches, and the stroke of the cutters is about three inches, or about twice the full width of the cutters; hence each cutter N will cut twice or against two of the cutters O each way, and as the gearing F H is proportioned to give a rapid reciprocation to the cutters N the machine will cut considerably faster than it will ordinarily be moved over the lawn; hence the cutters will not clog and will cut freely and easily and always do good clean work.

The machine may be operated to cut underneath fences and over walks and in other places where mowers having revolving cutters or beaters would be useless, and because of its few direct-acting parts my mower may be operated effectively with the expenditure of a comparatively small amount of power applied to its handle C, as will readily be understood.

Having thus fully described my invention, I claim as new and desire to secure by Letters Patent—

1. In a lawn-mower, the combination, with the frame and the bracket-plates secured thereto and having screw-threaded holes therein, of the rearwardly-extending flat shoes having fixed upwardly-projecting threaded stems $r$ forward of their centers working loosely in said threaded apertures to allow the stems and shoes free horizontal movement and vertical adjustment, substantially as set forth.

2. The combination, with the L-shaped bar B, carrying the fixed cutters, the reciprocating cutter-bar M, having cutters N secured thereto and resting on said fixed cutters, and the cutter-bar guides P P, having downward-extending front and rear lugs overlapping the rear and front edges of the cutter-bar and the rear and top edges of the vertical flange of the bar B, of the side bars A, secured to the bar B at their forward ends, a single drive-wheel journaled between the side bars and having a gear-wheel on one side, a longitudinally-extending crank-shaft I, journaled in the axle of said drive-wheel and in an arm extending up from the bar B, a pinion on said shaft meshing with the gear on the drive-wheel, and a pitman connecting the said crank-shaft and cutter-bar, substantially as set forth.

CHARLES A. OLCOTT.

Witnesses:
GEO. T. RISINGER,
JAMES L. YOHR.